United States Patent
Rashidi et al.

(10) Patent No.: US 9,006,130 B2
(45) Date of Patent: Apr. 14, 2015

(54) ALUMINA NANOTUBE/NANOROD SUPPORTED HYDRODESULFURIZATION NANOCATALYST, METHOD OF PREPARATION AND APPLICATION

(75) Inventors: Fereshteh Rashidi, Tehran (IR);
Alimorad Rashidi, Tehran (IR);
Kheirollah Jafari Jozani, Karaj (IR);
Ali Nemati Kharat Ghaziani, Tehran (IR); Morteza Rezapour, Tehran (IR);
Hamidreza Bozorgzadeh, Tehran (IR)

(73) Assignee: Research Institute of Petroleum Industry (RIPI), Tehran (IR)

( * ) Notice: Subject to any disclaimer, the term of this patent is extended or adjusted under 35 U.S.C. 154(b) by 49 days.

(21) Appl. No.: 13/253,053

(22) Filed: Oct. 4, 2011

(65) Prior Publication Data

US 2012/0083643 A1  Apr. 5, 2012

(30) Foreign Application Priority Data

Oct. 5, 2010 (EP) ...................... 10186572

(51) Int. Cl.
*C07C 7/00* (2006.01)
*B01J 27/188* (2006.01)
(Continued)

(52) U.S. Cl.
CPC *B01J 21/04* (2013.01); *B01J 23/85* (2013.01); *B01J 23/882* (2013.01); *B01J 29/166* (2013.01); *B01J 35/0013* (2013.01); *B01J 35/06* (2013.01); *B01J 35/1023* (2013.01); *B01J 35/1047* (2013.01); *B01J 35/1061* (2013.01); *B01J 37/0009* (2013.01); *B01J 37/0201* (2013.01); *B01J 37/0203* (2013.01); *B82Y 30/00* (2013.01); *B82Y 40/00* (2013.01); *C10G 45/08* (2013.01); *C10G 45/12* (2013.01); *Y10S 977/902* (2013.01); *Y10S 977/89* (2013.01)

(58) Field of Classification Search
None
See application file for complete search history.

(56) References Cited

U.S. PATENT DOCUMENTS

| | | | | |
|---|---|---|---|---|
| 7,005,059 | B1 * | 2/2006 | Quartararo et al. | 208/213 |
| 8,679,323 | B2 * | 3/2014 | Simon et al. | 208/110 |

(Continued)

FOREIGN PATENT DOCUMENTS

| | | |
|---|---|---|
| EP | 0 969 075 | 1/2000 |
| EP | 1 832 645 | 9/2007 |

(Continued)

OTHER PUBLICATIONS

"Atomic-scale insight into Structure and Morphology changes of MoS2 nanoclusters in hydrotrating catalysts" Journal of Catalysis, vol. 221, pp. 510-522, (2004) L.V. Lauritsen et al.*

(Continued)

*Primary Examiner* — Melvin C Mayes
*Assistant Examiner* — Douglas Call
(74) *Attorney, Agent, or Firm* — Arash Behravesh (57) ABSTRACT

The invention relates to a hydrodesulfurization nanocatalyst, use of the hydrodesulfurization nanocatalyst in a hydrodesulfurization process and a process for producing the hydrodesulfurization nanocatalyst. The hydrodesulfurization nanocatalyst can include a nanostructured alumina material, at least one metal selected from group VI B of the periodic table of elements, and at least one metal selected from group VIII B of the periodic table of elements.

12 Claims, 1 Drawing Sheet

(51) Int. Cl.
*B01J 21/04* (2006.01)
*B01J 29/10* (2006.01)
*B01J 23/85* (2006.01)
*B01J 23/882* (2006.01)
*B01J 29/16* (2006.01)
*B01J 35/00* (2006.01)
*B01J 35/06* (2006.01)
*B01J 35/10* (2006.01)
*B01J 37/00* (2006.01)
*B01J 37/02* (2006.01)
*B82Y 30/00* (2011.01)
*B82Y 40/00* (2011.01)
*C10G 45/08* (2006.01)
*C10G 45/12* (2006.01)

(56) References Cited

U.S. PATENT DOCUMENTS

| | | |
|---|---|---|
| 2002/0070147 A1 | 6/2002 | Sonnemans et al. |
| 2008/0017551 A1* | 1/2008 | Kiriyama et al. ............. 208/134 |
| 2010/0009267 A1* | 1/2010 | Chase et al. .................. 429/320 |

FOREIGN PATENT DOCUMENTS

| | | | | |
|---|---|---|---|---|
| WO | WO 98/19791 | * | 5/1998 | ............. C10G 45/04 |
| WO | WO 2005/092498 | * | 6/2005 | |
| WO | WO 2008/111960 | * | 9/2008 | ............. H01M 6/18 |

OTHER PUBLICATIONS

"Atomic-Scale Structure of Co-Mo-S Nanoclusters in Hydrotreating Catalysts" J.V. Lauritsen et al. Journal of Catalysts, vol. 197, pp. 1-5, 2001).*

* cited by examiner

ALUMINA NANOTUBE/NANOROD SUPPORTED HYDRODESULFURIZATION NANOCATALYST, METHOD OF PREPARATION AND APPLICATION

CROSS REFERENCE

The present application claims the benefit of EP 10 186 572.3 filed on Oct. 5, 2010, which is incorporated herein by reference in its entirety.

TECHNICAL FIELD

The present invention relates to a hydrodesulphurization (HDS) nanocatalyst, use of the hydrodesulphurization nanocatalyst in a hydrodesulphurization process and a process for the production of a hydrodesulphurization nanocatalyst.

BACKGROUND

Sulfur containing compounds present in oil derivatives and fuels can lead to air pollution and acid rains. The presence of high concentrations of sulfur containing compounds in oil derivatives can also lead to corrosion in containers, reactors, pipes and, metal joints and damaging the catalysts in downstream processes.

Gasoline and gas oil account for about 75 to 80% of the total refinery products. Most of the desulphurization processes are therefore meant to remove sulfur containing compounds from the refinery products. Furthermore, low-sulfur gas oils are harder to produce due because gas oils produced through catalytic fluidized bed cracking and coke formation contains about 2.5% wt. of sulfur with low cetane number, high density and high aromatic content.

Removal of sulfur is possible to some extent by conventional processes utilizing CoMo, NiMo, and CoNiMo catalysts over alumina support. Alumina is the most widely used support of hydrodesulphurization catalysts. Notable feature of alumina supports is their ability to provide high dispersion of the active metal components.

One of the drawbacks of using alumina as a support material during hydrodesulphurization process is formation of coke, which reduces the catalyst's lifetime and leads to frequent and compulsory change of the catalytic bed in the reactor. Another drawback of using alumina as a support material during hydrodesulphurization process is the strong interaction of the alumina support with metal oxides, which decreases the sulfidation yield. This can lead to decrease in the catalyst's surface area.

EP 0 969 075 A1 describes the use of group VI and group VIII metals over alumina support for preparation of hydrodesulfurization catalysts for diesel fractions. The most active catalyst (B1) is supported on alumina with a surface area of 372 m²/g and a pore volume of 0.65 cm³/g. The catalyst contained 25% wt. of molybdenum and cobalt oxides, 3% wt. of $P_2O_5$, and 5% wt. of HY zeolite having a surface area of 267 m²/g, pore volume of 0.45 cm³/g, and an average pore size of 7.8 nm. The hydrodesulfurization of gas oil was carried out at 350° C., 3.5 MPa with a liquid hourly space velocity (LHSV) of 1.5 h$^{-1}$. This process reduced the sulfur content of the feed from 13500 ppm to 140 ppm.

EP 0 969 075 A1 also describes catalyst E based on alumina support with a surface area of 243 m²/g and a pore volume of 0.41 cm³/g. The catalyst contained 30% wt. of molybdenum and cobalt oxides, 3% wt. of $P_2O_5$, and 5% wt. of HY zeolite having a surface area of 267 m²/g, a pore volume of 0.455 cm³/g, and an average pore size of 7.8 nm. The hydrodesulfurization of gas oil process was carried out at a temperature of 340° C., a pressure of 3.5 MPa, and an LHSV of 1.5 h$^{-1}$. This process reduced the sulfur content of the feed from 13500 ppm to 228 ppm.

According to example 15 of WO 99/673455 a catalyst is supported on alumina with a surface area of 214 m²/g, pore volume of 0.41 cm²/g, and pore diameter of 7.6 mm. The catalyst contained 20.44% wt. of molybdenum and cobalt oxides. According to WO 99/673455, this catalyst reduced the sulfur content of the feed from 12286 ppm to 115 ppm when the hydrodesulfurization of gas oil process was carried out under at a pressure of 4 MPa, at a temperature of 354° C., and an LHSV of 1.35 h$^{-1}$.

EP 1 832 645 A1 discloses a catalyst containing 16% wt. of molybdenum and cobalt oxides. According to EP 1 832 645 A1, this catalyst reduced the sulfur content of the feed from 11600 ppm to 6.5 ppm when the hydrodesulfurization of gas oil process was carried out at a temperature of 345° C., pressure of 7 MPa, $H_2$/feed of 440 Ncm³/cm³, and an LHSV of 1.2 h$^{-1}$.

US Pat. Appl. Pub. No. 2002/0070147 discloses a catalyst containing 25% wt. of molybdenum and cobalt oxides and 3% wt of $P_2O_5$. According to US Pat. Appl. Pub. No. 2002/0070147, this catalyst reduced the sulfur content of the feed from 12000 ppm to 21 ppm when the hydrodesulfurization of gas oil process was carried out at a temperature of 330° C., a pressure of 4 MPa, $H_2$/feed of 300 Ncm³/cm³, and a space velocity of 2 h$^{-1}$ after being sulfidized with a 2.5% DMDS solution.

The general, the common drawbacks of hydrodesulfurization catalysts based on alumina are clogging of the catalyst and non-homogeneous distribution of active metals. Given that high metal loadings are not possible in these catalysts, the resulting catalysts cannot be used in high concentrations of dibenzothiophenes and alkyl dibenzothiophenes. Accordingly, hydrodesulfurization of gas oil process requires low LHSV, high pressure, and high $H_2$/feed ratios, which in turn increase coke formation. Coke formation reduces catalyst lifetime due to blockade of active sites of the catalyst.

Accordingly, a need exists for a hydrodesulfurization nanocatalyst that overcomes the problems of the prior art catalysts by having an improved catalyst activities and an increased hydrodesulfurization yield.

SUMMARY OF THE INVENTION

The present teachings provide a hydrodesulfurization nanocatalyst that includes a nanostructured alumina material, at least one metal selected from group VI B of the periodic table of elements, and at least one metal selected from group VIII B of the periodic table of elements.

The present teachings provide that the nanostructured alumina material includes at least one of alumina nanorods and alumina nanotubes.

The present teachings provide that the nanostructured alumina material is nanostructured gamma-alumina.

The present teachings provide that the nanostructured alumina material includes a surface area of from about 450 to about 800 m2/g.

The present teachings provide that the nanostructured alumina material includes a pore volume of from about 0.8 to about 3 cm³/g.

The present teachings provide that the nanostructured alumina material includes a mesoporous pore diameter of from about 9 to about 30 nm.

The present teachings provide that the at least one metal selected from group VIB of the periodic table of elements and the at least one metal selected from group VIIIB of the periodic table of elements are present in an amount of from about 1 to about 30% by weight.

The present teachings provide that the at least one metal selected from group VIB of the periodic table of elements comprises at least one of molybdenum and tungsten.

The present teachings provide that the at least one metal selected from group VIIIB of the periodic table of elements comprises at least one of nickel and cobalt.

The present teachings further provide that the hydrodesulfurization nanocatalyst further includes a zeolite Y.

The present teachings provide that the hydrodesulfurization nanocatalyst further includes at least one of $P_2O_5$ and $B_2O_3$.

The present teachings provide a method for removing sulfur from a stream by contacting the stream with a hydrodesulfurization nanocatalyst.

The present teachings provide a process for producing a hydrodesulfurization nanocatalyst, wherein the process includes providing a solution of at least one metal, impregnating the nanostructured alumina material in a solution comprising at least one metal to create a catalyst, and drying the catalyst.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DETAILED DESCRIPTION

The hydrodesulfurization nanocatalyst (herein after "the catalyst") of the present teachings includes a nanostructured alumina material with large pores and mesoporosity to create a better distribution of active metals over the nanostructured alumina material, a better presence of multilayer nanoclusters of the active metals and a better formation of active sites when compared to prior art catalysts. Furthermore, the catalysts of the present teachings reduce and/minimizes coke formation during hydrodesulfurization processes and; therefore, have an increased lifetime. In addition, the catalyst of the present teachings can work with relatively lower $H_2$/feed ratios in the sulfidation and/or hydrodesulfurization process. Additionally, the catalyst of the present teachings can function under relatively mild operating conditions when compared to conventional catalysts.

The catalyst of the present teachings can include a support and at least one active metal. The support can be porous and in a form of nano-sized particles. For example, the nano-sized particles can include a size of from about 1 to about 100 nonameters. According to one embodiment of the present teachings, the support is a nanostructured alumina material, such as alumina nanorods, alumina nanotubes and a mixture thereof. In one example, the support can be a gamma alumina. The at least one active metal can include at least two metals, one metal from group VIB of the periodic table of elements and one metal from group VIIIB of the periodic table of elements.

According to one embodiment of the present teachings, the nanostructured alumina material has surface area of from about 450 to about 800 $m^2$/g. For example, the nanostructured alumina material can include a surface area of from about 500 to about 650 $m^2$/g. In one exemplary embodiment, the nanostructured alumina material has a pore volume of from about 0.8 to about 3 $cm^3$/g, for example, a pore volume of from about 0.9 to about 2.5 $cm^3$/g.

The alumina material can be a mesoporous material. A mesoporous material can be defined as a material that includes a mesoporous pore diameter of from about 2 to about 50 nm, for example, a pore diameter of from about 9 to about 30 nm, or from about 10 to about 20 nm.

The ability to control of textural properties (surface areas, pore volumes, pore sizes), morphologies, and particle sizes is important to improve the potential of alumina in catalysis. The optimization of some of the properties, for example, increasing the specific surface area and creating unsaturated alumina species ($Al^V$ and $Al^{IV}$), which are acid centers able to catalyze chemical reactions, are important. Moreover, the tunable pore sizes and the high total pore volume make the nanostructured alumina material to be an ideal support for heterogeneous catalysis that require high loads of at least two metals without agglomeration in the hydrodesulfurization nanocatalyst.

The metal from group VIB of the periodic table of elements (hereinafter referred to as "the VIB metal") can include metals such as Cr, Mo, W, and tungsten, as mixtures thereof. Preferably, the VIB metal is at least one of molybdenum and/or tungsten, and more preferably molybdenum. The VIB metal is preferably in form of an oxide and/or sulfide, preferably in a form of an oxide. In one example, the VIB metal is in form of a nanocluster. A nanocluster in the present teachings is a group of atoms or molecules whose largest overall dimension is typically in the range of from about 1 to about 100 nanometers. Nanoclusters can include at least one dimension from about 1 to about 10 nanometers and a narrow size distribution.

The metal from group VIIIB of the periodic table of elements (hereinafter referred to as "the VIIIB metal") can include metals such as Fe, Ru, Os, Co, Rh, Ir, Ni, Pd, Pt and mixtures thereof. Preferably, the VIIIB metal is at least one of cobalt and/or nickel and more preferably cobalt. The VIIIB metal is preferably in form of oxide and/or sulfide, preferably oxide. In one example, the VIIIB metal is in form of a nanocluster.

In one exemplary embodiment, the active metals are cobalt and molybdenum. Cobalt and molybdenum are more active than W and Cr for removing sulfur compounds from oil containing high contents/amounts of sulfur compounds. Furthermore, cobalt and molybdenum are more readily available and less expensive than other metals such as W, Ir, Rh, Pt, Pd, Os and Ru.

In another exemplary embodiment of the present teachings, the catalyst can include nickel and molybdenum as active metals. This catalyst is capable of removing nitrogen compounds from oil that contains high contents/amounts of nitrogen compounds.

The content/amount of the VIB metals and VIIIB metals in the catalyst according to the present teachings can be from about 1 to about 30% by weight, for example, from about 8 to about 30% by weight. In one exemplary embodiment, the content/amount of the VIB metals and VIIIB metals can be from about 6 to about 22% by weight, for example, from about 16 to about 22% by weight. The weight percentages are relative to the weight of the whole catalyst.

According to one embodiment of the present teachings, the content/amount of the VIB metals in the catalyst can be from about 7 to about 22% by weight, for example, from about 10 to about 15% by weight. Additionally, the content/amount of the VIIIB metals in the catalyst can be from about 1 to about 8% by weight, for example from about 6 to about 7% by weight.

The catalyst according to the present teachings can include the VIB metal and the VIIIB metal in a molar ratio (VIB:VIIIB) of about 0.03:1.9, for example, about 0.2:0.5.

In one embodiment of the present teachings, the active metals are present on the nanostructured alumina material in form of multilayer nanoclusters. For example, the nanoclusters of the metals loaded on the nanostructured alumina material have diameters in the range of from about 1 to about 10 nm, such as from about 3 to about 7 nm. Each nanocluster of the metals loaded on the nanostructured alumina material can include from about 2 to about 8 layers (slabs), for example, from about 3 to about 6 layers (slabs).

In one embodiment of the present teaching, the nanoclusters include $CO_9S_8$, which can be derived from the slab-like (sheet-like) crystalline structure of $MoS_2$. $MoS_2$ has slab-like morphology on support materials. Promoters such as Co and Ni can be located at the edges of the $MoS_2$ slabs (sheets). The derived active CoMoS or NiMoS nanoclusters exist in monolayered (CoMoS type I) or multi-layered (CoMoS type II) morphologies on the support material. Nanoclusters have at least one dimension from about 1 to about 10 nm and a narrow size distribution. The hydrodesulfurization activity has been attributed to CoMoS or NiMoS sites located on the edges of the $MoS_2$ nanoclusters. The multi-layered $MoS_2$ nanoclusters are promoted with Co or Ni atoms. These $MoS_2$ nanoclusters deviate considerably in geometry and electronic structure from what is commonly assumed from the bulk properties of $MoS_2$. Moreover, the morphology and orientation (basal-bonded or edge-bonded) of CoMoS or NiMoS on the support material can affect the hydrotreating activity of the catalysts.

The activity in the nanocatalyst is related to the presence of CoMoS, NiMoS, CoWS, and NiWS structures that consist of small $MoS_2$ or $WS_2$ nanoclusters with Co or Ni promoter atoms located at the edges. Preferred catalysts of the present teachings include active metals in such nanoclusters.

The modification of the textural properties (surface area, pore volume and pore diameter) of the nanostructured alumina material induces variations in dispersion and morphology of active components and possible interactions between metals and nanostructured alumina material. This may change the activity and/or selectivity of the catalysts. The density of CoMoS phases on the catalyst can directly influence the catalytic activity. Also the morphology of the $MoS_2$ phase is important to the hydrodesulfurization activity.

According to an embodiment of the present teachings, the hydrodesulfurization nanocatalyst can include at least one additional metal selected from the group VIIIB of the periodic table of elements (hereinafter "second VIIIB") in form of oxides as promoters of the nanocatalyst.

Furthermore, it is the nanocatalyst according to the present teaching can include an additional compound of group IIIA and/or group VA of the periodic table of elements. The compound of group IIIA is hereinafter referred to as "the IIIA compound". The IIIA compound can include B, Al, Ga, In, and/or Tl. Preferably, the IIIA compound is a boron compound and more preferably is $B_2O_3$. In one example, boric acid is used to form $B_2O_3$. The content/amount of the IIIA compound can be from about 1 to about 5% by weight, for example from about 2.5 to about 3.5% by weight. The IIIA compound can improve the acidity of the catalyst which decreases interaction of the metals with the nanostructured alumina material and produces highly active sites, since it induces formation of the multilayered active metal on the support. The IIIA compound can also improve the acidity of alumina and increases the cracking, isomerization, and HDS/HYD (hydrodesulfurization/hydrogenation) reactions to overcome the sterically hindered adsorption of 4,6-dimethyldibenzothiophene (4,6-DMDBT) molecules in deep oils. Furthermore, the IIIA compound can improve the dispersion of the active metals on the surface of nanostructured alumina material by decreasing interaction between and the metals and the nanostructured alumina material which facilitates sulfide formation.

In one exemplary embodiment, the catalyst includes a compound of group VA (hereinafter referred to as "the VA compound"). The VA compound can include N and P. Preferably, the VA compound includes phosphorous and more preferably $P_2O_5$. It is preferred that phosphoric acid is used to form $P_2O_5$. The content/amount of VA compound in the nanocatalyst can be from about 1 to about 5% by weight. The VA and the IIIA compounds can lead to improvement of acidity of the catalyst. This decreases interaction of the active metals with the nanostructured alumina material so that highly active catalytic sites can be obtained, since it induces formation of the multilayered nanoclusters. Phosphorous modifies the distribution of catalytic sites to facilitate the formation of multilayer nanoclusters, changes the surface hydroxyl groups, and decreases the polymerization of Mo—S bonding to obtain higher hydrodesulfurization nanocatalyst activity. Phosphorous can also improve the catalytic Brønsted acidity allowing the migration of methyl groups in 4,6-DMDBT to decrease the sterically hindered adsorption.

According to an embodiment of the present teachings, the catalyst can include zeolite, for example, zeolite Y. In one example, the zeolite Y can be HY and/or USY. The HY and USY have acidic properties. Since the Brønsted acidity of HY is higher than USY, HY is preferred. The catalyst can include zeolite Y in an amount of from about 1 to about 5% by weight. The acidic zeolite facilitates isomerization of alkylated DBT (dibenzothiophene), resulting in enhanced hydrodesulfurization activity of refractory sulfur compounds. The acidification significantly helps to overcome the sterically hindered adsorption of 4,6DMDBT molecules in deep oils.

Although high percentages of acids like zeolite can lead to beneficial acidic catalyst, some catalysts are significantly deactivated by coking. Furthermore, adding low amounts of zeolite (e.g., below 1% by weight) will not increase the activity of the catalyst. Therefore, it is preferred to combine at least one IIIA compound and/or VA compound and zeolite.

According to one embodiment of the present teachings, the catalyst can include zeolite HY and $B_2O_3$, preferably in a ratio of about 1:0.5. In one example, the total content of zeolite HY and $B_2O_3$ in the catalyst is from about 1 to about 10% by weight.

The hydrodesulfurization nanocatalyst according to the present teachings is particularly suited to be used in a process for hydrodesulfurization. It is particularly preferred that the nanocatalyst of the present teachings is used in a hydrodesulfurization process of hydrocarbon feeds with a boiling point range of from about 40 to about 450° C. In one example, the hydrocarbon feeds are light and heavy naphtha, gasoline, and gas oil. According to another embodiment of the present teachings, the nanocatalyst can be used for hydrodesulfurizing residues of crude oil and sand oil.

Furthermore, the hydrodesulfurization nanocatalyst according to the present teachings is particularly suited to be used for the hydrodesulfurization of oil residues, light and heavy crude oil, sand oil, oil fractions with a boiling point range of from about 40 to about 450° C., light and heavy naphtha, gasoil, and furnace oil with a sulfur amount of up to about 5% by weight.

According to the present teachings, the process for producing the nanocatalyst of the present teachings can include:
- a) Providing a solution of at least one of the metals mentioned above,
- b) Impregnating the nanostructured alumina material in the solution of at least one metal, and
- c) Drying the resulting catalyst.

According to one embodiment of the present teachings, the solution of at least one metal is an aqueous solution. In one example, the solvent is water. Preferably, the solution includes at least two metals. In one example, the solution can also include an acid, such as phosphoric acid and/or boric acid and/or citric acid, or any combination thereof.

In one exemplary embodiment of the present teachings, the solution of at least one metal further includes at least one chelating agent. The chelating agent can be selected from citric acid, polyethylene glycol, malic acid, nitrilotriacetic acid (NTA), ethylenediaminetetraacetic acid (EDTA), cyclohexanediaminetetraacetic acid (CyDTA), ethylenediamine (ED), polyethylene glycol (PEG), tartaric acid, and/or any combination thereof. Preferably, the chelating agent is citric acid, polyethylene glycol,r malic acid, and/or any combination thereof. More preferably, the chelating agent is citric acid. These inexpensive organic carboxylic compounds easily form stable complexes with the metal ions and do not change into noxious nitrogen-containing fumes during hydrodesulfurization conditions. The chelating agent which is added to the impregnation solution during the preparation of the nanocatalyst increases the catalytic activity of the hydrodesulfurization nanocatalyst.

In one exemplary embodiment, a salt can be used for the preparation of the solution of the present teachings. The salt can be selected from a group of water soluble salts of the metals used, including but not limited to cobalt nitrate, acetate, carbonate, sulfate, thiocyanate, acetyl acetonate and/or nickel nitrate, acetate and/or carbonate and/or ammonium heptamolybdate, molybdenum oxide, sodium molybdate, or any mixtures thereof. In one example, the salt can include the metals Co and/or Mo.

In a further embodiment of the present teachings, the metal is in the form of oxides and/or sulfides and/or organometallic compounds. The metals can be selected from the group including Co, Ni, and Mo. The organometallic compound can be selected from the group including $Mo(CO)_6$, $Co(CO)_3NO$, $CO_2(CO)_8$, $Ni(CO)_4$, $Cp_2Ni$, $Cp_2Co$, nickel stearate, and nickel oleate, preferably $Mo(CO)_6$. The application of the metal in the form of an organometallic compound can provide controllable formation of metal oxides and/or sulfides nanostructures on the nanostructured alumina material.

In another embodiment of the teachings, the process can include a solution having at least one metal selected from the VIIIB metals, the VIB metals, the IIIA metals, the VA metals, or any combination thereof for impregnating these metals on the nanostructured alumina material.

In another embodiment of the present teachings, the organometallic compounds are in a form of metal oxides and/or sulfides. These metal oxides and/or sulfides can be synthesized in nano-scale through methods such as chemical vapor deposition (CVD), hydrothermal, sol-gel, and/or microemulsion and to be dispersed over the nanostructured alumina. The chemical vapor deposition (CVD), hydrothermal, sol-gel and/or microemulsion techniques can be used for the deposition of the metal structure on the nanostructured alumina material. Preferably the metal structure on the nanostructured alumina material is in the form of nanoclusters.

In one exemplary embodiment of the present teachings, the nanostructured alumina material is prepared through a co-precipitation method in combination with CVD method which includes preparation of nanostructured alumina material from an alkaline solution, aluminum inorganic salts and organic additives. The alkaline solution can include ammonia, urea, and/or hexamethylenetetramine (HMTA). Preferably, the alkaline solution includes urea and ammonia. The aluminum inorganic salt can be selected from a group of aluminum nitrate, chloride and/or sulfate. Preferably, the aluminum inorganic salt is chloride. The organic additive can be selected from the group of sorbitol, ammonium acetate, citric acid, EDTA, NTA, ethylene glycol (EG), PEG, malic acid, tartaric acid, CyDTA, ED and/or EN. Preferably, the organic additives are selected from the group sorbitol and citric acid. The molar ratio of aluminum solution to alkaline solution is about 1:5, for example, about 2:3. The molar ratio of aluminum solution to organic additive can be about 1:3, for example, about 1.5:2.5. The pH of the solution can be from about 6 to about 10, for example, from about 8 to about 9.

According to one embodiment of the present teachings, the nanostructured alumina material is prepared with one-dimensional interconnected nanorod-like mesostructures, through a non-toxic and non-surfactant-templating route by using the sol-gel method from aluminum alkoxides, organic solvents, organic acid or inorganic acid, and water. The nanostructured alumina material can be produced in particles that have particle sizes of from about 1 to about 10 nm by dimension, for example from about 2 to about 5 nm by dimension. The nanostructured alumina material can include a length of from about 1 to about 100 nm, for example from about 5 to about 60 nm. The aluminum alkoxides can be selected from the group of tri-iso-propoxide, sec-butoxide and etoxide. Preferably, the aluminum alkoxide is aluminum tri-iso-propoxide. The organic solvents can be selected from the group of tartaric acid, citric acid, malic acid, lactic acid, acetic acid, and/or any combination thereof. Preferably, the organic solvent is citric acid. The inorganic acid is selected from the group of $H_2SO_4$ and/or $H_3PO_4$.

The textural properties of alumina materials can depend on the preparation methods and conditions.

The textural parameters, size of particles and morphology of the nanostructured alumina material of the present teachings can be tuned through control of hydrolysis and condensation rates and by variation of temperatures, concentration, type of alkoxide, and water-to-alkoxide ratio, aging time, drying conditions, calcinations temperature, and atmosphere could affect the texture of the nanoparticles of alumina prepared by the sol-gel technique. Variation of these parameters can affect the hydrolysis, condensation, and polymerization of the aluminum alkoxide, thus modifying the properties of the final nanostructured alumina material. These properties include, for example, crystallinity, structure, morphology and texture.

The nanostructured alumina material can be prepared from aluminum alkoxides-derived gels or aluminum inorganic salts in the presence of organic additives or organic solvents. The particle size, morphology (like nanorod, nanotube, nanoparticles), surface area, pore volumes, pore diameters, uniform pore sizes, large amount of aluminum defect centers ($Al^V$), thermal stability as well as the textural properties of the resulting powders can be tuned by adjusting the synthesis conditions such as pH, Al to water ratio, Al to acid ratio, Al to organic additive ratio, temperature, organic additives type, concentration, alkoxide type and drying condition.

The nanostructured alumina material can be provided by extruding without a binder. The binder would block a portion of the pores of the nanostructured alumina material. If a binder is used it would have to be removed by an additional heating step which leads to larger crystallinity and a decreased active surface area. Furthermore, the production of a nanostructured alumina material without a binder is more economical since the heating step is omitted.

According to the present teachings, impregnating is defined as when nanostructured alumina material is immersed in the solution of at least one metal. Impregnating also implies that the nanostructured alumina material is prepared in situ in the solution of at least one metal. The in situ preparation method for nanostructured alumina materials occurs in a solution of at least one metal, through a co-precipitation method in combination with CVD method, where the reaction solution contains aluminum oxide precipitated from alkaline solution, aluminum inorganic salts and organic additives and the metal ions in the solution are directly impregnated on the nanostructured alumina materials. The alkaline can be selected from ammonia, urea, HMTA, and/or any combination thereof. The inorganic salts are can be selected from nitrate and/or chloride. The organic additives can be selected from sorbitol, ammonium acetate, EDTA, NTA, and/or any combination thereof.

In one embodiment of the present teachings, the solution of at least one metal is dispersed onto the nanostructured alumina material in consecutive impregnation steps.

According to one exemplary embodiment of the present teachings, any method leading to the formation of nanoclusters on the nanostructured alumina material, like impregnation, can be used.

According to the present teachings, the nanoclusters can be formed on the nanostructured alumina material by controlled co-precipitation or impregnation, and preferably by impregnation. The impregnation is preferred since it is economically more attractive. The immersion methods of nanostructured alumina materials can include wet or dry incipient pore-volume co-impregnation, and preferably, wet incipient pore-volume co-impregnation.

According to one embodiment of the present teachings, the drying step can take place at a temperature of from about 50° C. to about 200° C., such as from about 100° C. to about 150° C., preferably at about 120° C. The drying step can be performed from about 4 to about 34 hours, for example, from about 5 to about 15 hours, preferably, from about 6 to about 12 hours.

The catalyst according to the present teachings can be in the form of tablets and/or certain size fractions obtained by sieving the catalyst. The catalyst can include a mesh size of about 20/10. Using a catalyst in a defined shape and/or size can prevent a reactor from choking and avoid the blockage of the reactor.

In one example, the catalyst is extruded. Preferably, the nanocatalyst of the present teachings does not require any extrusion processes after preparation. Avoiding any extrusion processes after preparation prevents the formation of active sites with monolayer structures and lower catalytic activity due to lower surface area, as heating at high temperatures to stabilize the nanocatalyst for the use in high pressure of hydrodesulfurization reactions decomposes the chelated metals/chelating reagents. According to the present teachings, the extruded nanostructured alumina material is only required to be dried at low temperatures after preparation of the nanocatalyst. This leads to the formation of active sites with multilayer structures and higher catalytic activity.

Additionally, the nanocatalyst of the present teachings does not require a calcination step prior to sulfidation. This results in increased activities of the multilayer catalytic species. Furthermore, the chelating reagents decompose less than catalysts which require a calcination step prior to sulfidation.

In one embodiment of the present teachings, the process includes the step of sulfidizing the catalyst. This sulfidizing step may take place in any reactor independently of the shape or structure of the reactor, but preferably in a fixed bed reactor, and more preferably in a steel reactor. The reactor can include an inner diameter of from about 0.5 cm to about 10 cm, such as, from about 1 cm to about 5 cm, preferably from about 1.5 cm to about 2.5 cm, and most preferably about 1.58 cm. The reactor can include an outer diameter of from about 0.5 cm to about 15 cm, such as, from about 1 cm to about 10 cm, preferably from about 1.8 cm to about 6 cm, and most preferably of about 2.13 cm. The reactor can include a thickness of from about 0.1 cm to about 6 cm, such as from about 0.15 cm to about 3 cm, preferably of about 0.28 cm. The reactor can also include a length of from about 30 cm to about 70 cm, such as from about 40 cm to about 60 cm, preferably from about 48 cm to about 55 cm, and most preferably of about 52 cm. Sulfidizing may be conducted in the presence of any hydrocarbon fraction that includes a sulfur containing species.

In one embodiment of the present teachings, the hydrocarbon fraction can be an isomax fraction including from about 1 to about 2% by weight of dimethyl disulfide, for example, 1% by weight of dimethyl disulfide.

Isomax is can be defined as a product of the "isomax unit" in oil refineries. In an "isomax unit", heavy hydrocarbons such as fuel oil and vacuum gas oil are converted (cracked) to light and valuable products, such as middle distillates. The isomax process takes place at high temperatures and pressures, and hence the sulfur content of isomax is very low.

Sulfidation of the present teachings can take place at a liquid hourly space velocity (LHSV) of 1 to 5 $h^{-1}$. In one example, sulfidation takes place at a pressure of from about 0.1 to about 7 MPa. The temperature at which the sulfidation can be conducted can range from about 200° C. to about 450° C. Furthermore, the hydrogen/hydrocarbon ratio can be from about 100 to about 500 $Nm^3/m^3$, for example, from about 150 to about 250 $Nm^3/m^3$.

The catalyst of the present teachings can also be used in hydrodesulfurizing petroleum products. Hydrodesulfurization is among the processes used for treating sulfur-containing gas and oil streams in refineries. According to the process, the sulfur-containing hydrocarbon streams are treated over a catalytic bed, under different operating conditions that are dictated by their nature (see Table 1 below for the operating conditions corresponding to some typical hydrocarbon streams). A hydrodesulfurization process can be performed in the presence of $H_2$-containing gas, which reacts with the sulfur-containing compounds and converts them to $H_2S$, which is later neutralized and separated. The hydrodesulfurization reaction is expressed, for example for ethanethiol ($C_2H_5SH$), which is a sulfur compound present in some petroleum products, as:

ethanethiol + hydrogen → ethane + hydrogen sulfide↑

$C_2H_5SH + H_2 \rightarrow C_2H_6 + H_2S\uparrow$

TABLE 1

Typical Operating Conditions

| Fuel | Temperature/ °C. | Pressure/ MPa | Liquid Hourly Space Velocity/h$^{-1}$ |
|---|---|---|---|
| Naphtha | 100-370 | 1-5.5 | 0.5-10 |
| Diesel (gasoline) | 200-400 | 1.7-10.3 | 0.5-4 |
| Heavy diesel (gasoline) | 260-430 | 1.7-17.2 | 0.3-2 |
| Lubrication oil | 200-450 | 0.7-20.1 | 0.2-5 |
| Distillation residue | 340-450 | 6.9-34.5 | 0.1-1 |

It is an advantage of the nanocatalyst of the present teachings that the production of the nanocatalyst does not require a calcination step and that the nanocatalyst works properly even at conditions that are milder than the typical operating conditions of prior art catalysts. The catalyst of the present teachings may be used in a process having a pressure of from about 0.1 to about 7 MPa, a temperature of from about 250 to about 400° C., an LHSV of from about 1 to about 5 h$^{-1}$, and a hydrogen/hydrocarbon ratio of from about 100 to about 500 Nm$^3$/m$^3$. The catalyst of the present teachings may be used with a broad variety of feedstocks. For example, the catalyst of the present teachings can be used in order to desulfurize hydrocarbon feedstocks with boiling points in the range of from about 40 to about 450° C.

In one example, the nanocatalyst of the present teachings may be used in a process having a pressure of from about 3 to about 5 MPa, a temperature of from about 250 to about 350° C., an LHSV of from about 1.5 to about 3 h$^{-1}$, and a hydrogen/hydrocarbon ratio of from about 200 to about 300 Nm$^3$/m$^3$.

The nanocatalyst of the present teachings can also be used in a process having a pressure of from about 0.1 to about 7 MPa, a temperature of from about 250 to about 400° C., an LHSV of from about 1 to about 5 h$^{-1}$, and a hydrogen/hydrocarbon ratio between 100 and 500 Nm$^3$/m$^3$.

Preferably, the nanocatalyst of the present teachings is used in a hydrodesulfurization process.

Figure 1:
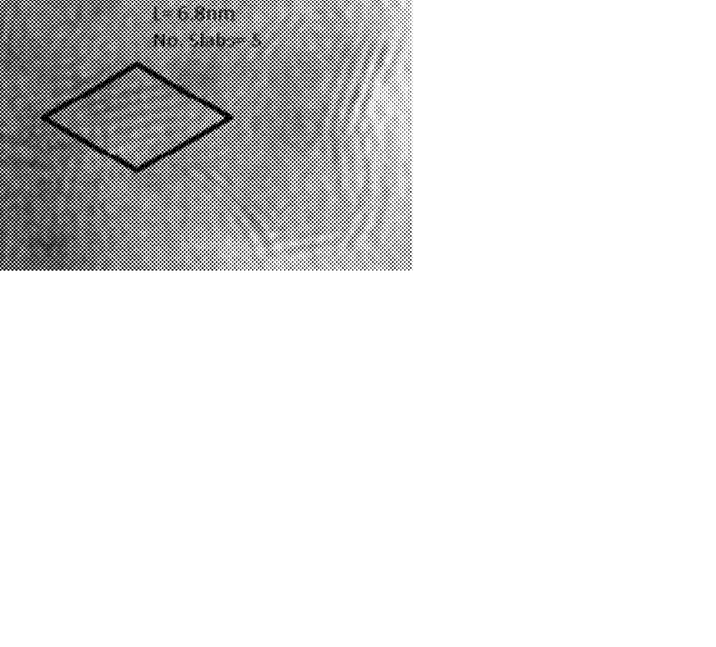
FIG. 1 is a photo of multi-layered CoMoS formed on a nanostructured alumina material.

FIG. 1 is a photo of a multi-layered (3 to 6 layers) CoMoS with a length of from about 3 to about 3 nm formed on a nanostructured alumina material. As shown in FIG. 1 the CoMoS type II which is located at the edges of multilayers of MoS$_2$ would be much more accessible to large molecules than CoMoS type I, which is located at the edges of the single layer of MoS$_2$. Accordingly, the use of the nanostructured alumina material with high surface area, modified acidity and lower interactions between metals and the nanostructured alumina material improves the high dispersion of high density of CoMoS type II phases. On a multilayered support material with higher surface area, pore volume, and pore diameter, more active sites per nanostructured alumina material exist, which provides higher catalytic activity compared to nanocatalysts having alumina support material with a monolayered morphology. Furthermore, the multilayered CoMoS nanoclusters respond to the more active sites with a higher DBT hydrodesulfurization activity due to a less steric hindrance for the adsorption of the reactant molecules.

EXAMPLES

It should be recognized that the examples below are provided to aid in a general understanding of the present teachings, and the scope of the invention is not limited to the content of the examples.

Example 1

The Effect of Citric Acid and Zeolite in the Absence of Phosphorous

A solution of 3 g of cobalt carbonate, 5 g of molybdenum oxide, and 7 g of citric acid in 40 g of water was prepared and was heated for the complete dissolution of the salts therein. The metals in the solution were then impregnated on 13 g of nanorod gamma alumina already containing 3% of HY zeolite (surface area of 500 m$^2$/g and pore volume of 1.8 cm$^3$/g) that was extruded to a mesh size range of 10-20. The resulting catalyst was then dried for 24 hours at 100° C. and was named C.1

Example 2

The Effect of Phosphorous and Citric Acid in the Absence of Zeolite

A solution of 3 g of cobalt carbonate, 5 g of molybdenum oxide, 7 g of citric acid and 1.6 g of phosphoric acid in 40 g of water was prepared and was heated for the complete dissolution of the salts therein. The metals in the solution were then impregnated on 13 g of nano-rod gamma alumina (surface area of 500 m$^2$/g and pore volume of 1.8 cm$^3$/g) that was extruded to a mesh size range of 10-20. The resulting catalyst was then dried for 24 hours at 100° C. and was named C.2.

Example 3

The Effect of Citric Acid in the Presence of Zeolite and Phosphorous

A solution of 3 g of cobalt carbonate, 5 g of molybdenum oxide, 7 g of citric acid and 1.6 g of phosphoric acid in 40 g of water was prepared and was heated for the complete dissolution of the salts therein. The metals in the solution were then impregnated on 13 g of nano-rod gamma alumina already containing 3% of HY zeolite (surface area of 500 m$^2$/g and pore volume of 1.8 cm$^3$/g) that was extruded to a mesh size range of 10-20. The resulting catalyst was then dried for 24 hours at 100° C. Based on the tests performed under different pressures of 2-4 MPa the catalysts were named C3-1, C3-2, C3-3 and C3-4.

Example 4

The Effect of a Total of 22% of MoO$_3$ and CoO in the Presence of Citric Acid, Zeolite and Phosphorous A solution of 4 g of cobalt carbonate, 6 g of molybdenum oxide, 8 g of citric acid and 1.6 g of phosphoric acid in 40 g of water was prepared and was heated for the complete dissolution of the salts therein. The metals in the solution were then impregnated on 13 g of nano-rod gamma alumina already containing 3% of HY zeolite (surface area of 500 m$^2$/g and pore volume of 1.8 cm$^3$/g) that was extruded to a mesh size range of 10-20. The resulting catalyst was then dried for 24 hours at 100° C. Based on the tests performed under different pressures of 2-4 MPa the catalysts were named C4-1-C4-11.

Example 5

The Effect of the Amount of Phosphorous in the Presence of Citric Acid and Zeolite A solution of 3 g of cobalt carbonate, 5 g of molybdenum oxide, 7 g of citric acid and 2 g of phosphoric acid in 40 g of water was prepared and was heated for the complete dissolution of the salts therein. The metals in the solution were then impregnated on 13 g of nano-rod gamma alumina already containing 3% of HY zeolite (surface area of 500 m²/g and pore volume of 1.8 cm³/g) that was extruded to a mesh size range of 10-20. The resulting catalyst was then dried for 24 hours at 100° C. The catalyst was named C.5.

Example 6

The Effect of the Presence of B in the Presence of Citric Acid and Zeolite

A solution of 3 g of cobalt carbonate, 5 g of molybdenum oxide, 7 g of citric acid and 0.8 g of boric acid in 40 g of water was prepared and was heated for the complete dissolution of the salts therein. The metals in the solution were then impregnated on 13 g of nano-rod gamma alumina already containing 3% of HY zeolite (surface area of 500 m²/g and pore volume of 1.8 cm³/g) that was extruded to a mesh size range of 10-20. The resulting catalyst was then dried for 24 hours at 10° C. The catalyst was named C.6.

Example 7

The Effect of the Presence of B in the Presence of Citric Acid, Zeolite and Phosphorous A solution of 3 g of cobalt carbonate, 5 g of molybdenum oxide, 7 g of citric acid, 1.8 g phosphoric acid and 0.8 g of boric acid in 40 g of water was prepared and was heated for the complete dissolution of the salts therein. The metals in the solution were then impregnated on 13 g of nano-rod gamma alumina already containing 3% of HY zeolite (surface area of 500 m²/g and pore volume of 1.8 cm³/g) that was extruded to a mesh size range of 10-20. The resulting catalyst was then dried for 24 hours at 100° C. The catalyst was named C.7.

Example 8

The Effect of an Amount of 16% wt. of $MoO_3$ and CoO in the Presence of Citric Acid, Zeolite and Phosphorous A solution of 3 g of cobalt carbonate, 4 g of molybdenum oxide, 6 g of citric acid, 1.6 g phosphoric acid in 40 g of water was prepared and was heated for the complete dissolution of the salts therein. The metals in the solution were then impregnated on 13 g of nano-rod gamma alumina already containing 3% of HY zeolite (surface area of 500 m²/g and pore volume of 1.8 cm³/g) that was extruded to a mesh size range of 10-20. The resulting catalyst was then dried for 24 hours at 100° C. The catalyst was named C.8-1 to C.8-3.

Example 9

Evaluation of Catalyst Properties

Catalysts C.1 to C.8 were tested for the diesel hydrocarbon fractions containing 13500 ppm of sulfur compounds as described in Table 2 in a fixed bed reactor as described above under identical operating conditions. 7 ml of the catalyst was used in the tests. All catalysts were sulfidized with an isomax feed containing 1% wt of dimethyl sulfide.

TABLE 2

| The Properties of the Diesel Feed Used | |
|---|---|
| Density at (15° C.) g/cm³ | 0.85 |
| Color (ASTM D156) | +1.5 |
| Sulfur (mass ppm) | 13500 |
| (Distillation) | 160 to 390° C. |
| IBP at 760 mmHg | 160° C. |
| 5% Vol. | 182° C. |
| 10% Vol. | 198° C. |
| 20% Vol. | 224° C. |
| 30% Vol. | 249° C. |
| 40% Vol. | 269° C. |
| 50% Vol. | 286° C. |
| 60% Vol. | 302° C. |
| 70% Vol. | 316° C. |
| 80% Vol. | 333° C. |
| 90% Vol. | 355° C. |
| 95% Vol. | 372° C. |
| FBP | 390° C. |

The reactor temperature was initially increased to 180° C. with a ramp of 40° C./h using the hydrogen stream, before the injection of the sulfidation feed after which the temperature was raised to 260° C. with a ramp of 20° C./h and then to 310° C. with a ramp of 10° C./h. The reaction was continued for 12 hours in this temperature, and the $H_2$/hydrocarbon feed ratio and pressure were kept at 200 Nm³/m³ and 3 MPa during the reaction time.

In the next step, the diesel fuel is injected into the reactor and the reaction conditions were 320-350° C. and 1.5 to 7 MPa with an LHSV of 0.8-2 h⁻¹ and $H_2$/hydrocarbon feed ratio of 170-200 Nm³/m³. The reaction was continued for 96 hours and the feed was changed and analyzed in 24 hour intervals. The desulfurization activities are shown in Table 4.

Comparisons between the operating conditions of the sulfidation and hydrodesulfurization processes, metal loading of the catalysts, the amount of additives and the outlet sulfur content for catalysts of the present teachings and prior art catalysts are made in Table 3.

EP 0 969 075 uses an $H_2S/H_2$ gas mixture for the sulfidation of the catalyst and US 2002/0070147 uses a 2.5% wt. dimethyl sulfoxide solution, the former being non-economical and the latter being more concentrated than the solution used in the present invention (1% wt dimethyl sulfoxide solution). The comparison shows the higher and better activity of the catalyst of the present teachings. The operating conditions of the process of the present teachings are relatively mild leading to better results. The best catalyst disclosed in EP 1 832 645 contains a total metal loading of 16% wt., and works at a very high pressure of 7 MPa, temperature of 345° C., high $H_2$/Feed ratio of 440 NL/L with a low LHSV of 1.2 h⁻¹ reducing the sulfur content of the feed from 11600 ppm to 6.5 ppm. This is while the nanocatalysts C.4-11 of the present teachings, having a loading of 22% wt. works under a much lower pressure of 3.4 MPa, temperature of 340° C., lower $H_2$/Feed ratio of 200 NL/L, and higher LHSV of 2 h⁻¹ reducing the sulfur content of the feed from 13500 ppm to 5 ppm. Also the other nanocatalysts C.8-3, containing 16% wt. of the metals, still works well under a pressure of 4.5 MPa, temperature of 340° C., lower $H_2$/Feed ratio of 200 NL/L, and higher LHSV of 2 h⁻¹ reducing the sulfur content of the feed from 13500 ppm to 5 ppm.

US Pat. Appl. Pub. No. 2002/0070147 containing a total metal loading of 25% wt, 3% wt. of $P_2O_5$ is claimed to work at 330° C., under a pressure of 4 MPa, high $H_2$/Feed ratio of 300 NL/L and reduces the sulfur content of the feed from 12000 ppm to 21 ppm, while catalyst C3-2 of the present teachings having a less metal loading of 20% wt. works under milder operating conditions of 3 MPa, 330° C. and H$_2$/Feed ratio of 200 NL/L, yet reducing the sulfur content of the feed from 13500 ppm to 20 ppm. Also nanocatalyst C.7, with the same properties of C3-3, works under milder operating conditions of 3.5 MPa, 330° C. and a H$_2$/Feed ratio of 200 NL/L, and reduces the sulfur content of the feed from 13500 ppm to 11 ppm most probably due to the presence of phosphorous and boron at the same time.

Nanocatalyst C3-4 tested in the same conditions as in US Pat. Appl Pub. No. 2002/0070147 but still with lower H2/Feed ratios, reduces the sulfur content of the feed from 13500 ppm to 14 ppm. Another catalyst in US Pat. Appl Pub. No. 2002/0070147 having a total metal loading of 25% wt., and working under operating conditions of 340° C., 2 MPa, H$_2$/Feed=300, LHSV=1.5 h$^{-1}$ does not have good desulfurization properties reducing the sulfur content from 12000 ppm to only 51 ppm while nanocatalyst C3-1 of the present teachings working under 330° C., 2 MPa, H$_2$/Feed=200, LHSV=2 h$^{-1}$ reduces sulfur from 13500 ppm to 39 ppm.

All catalysts in EP 0 969 075 show relatively worse behaviors when compared to those of the present teachings. The best catalyst (i.e. B1) has a total metal, phosphorous and zeolite loading of 25% wt., 3% and 5% wt. respectively, and is reported to work under 350° C., 3.5 MPa and LHSV=1.5 h$^{-1}$ but reduces the sulfur content of the feed from 13500 ppm to 140 ppm, which is a yield far more than that of even nanocatalyst C1 of the present teachings which reduces the sulfur content from 13500 ppm to 47 ppm under milder operating conditions.

A previous invention disclosed in the patent application EP 08 170 413.2 encompasses a CoMoCNT catalyst with a total metal loading of 25% wt., 5% wt. of P$_2$O$_5$ and works at 350° C. and pressure of 5 MPa and LHSV=1.5 h$^{-1}$ reduced the sulfur content of the feed from 13500 ppm to 200 ppm, which is not comparable with the results of the catalyst of the present teachings.

TABLE 3

Comparison Between the Catalyst of the Present Invention and Those of the Prior Art

| Pat. No. | MoO3 + CoO (wt %) | Additives P2O5 (wt %) | Additives B$_2$O$_3$ (wt %) | Additives Zeolite (wt %) | Reaction Conditions Tem. (° C.) | Reaction Conditions Pressure (MPa) | Reaction Conditions LHSV (h$^{-1}$) | Reaction Conditions H2/Oil ratio (Ncm$^3$/cm$^3$) | Sulfur Feed (ppm) | Sulfur Product (ppm) | Cat. |
|---|---|---|---|---|---|---|---|---|---|---|---|
| EP0969075A1 | 13 | 3 | — | 5 | 340 | 3.5 | 1.5 | — | 13500 | 329 | P |
| EP0969075A1 | 20 | 3 | — | 5 | 340 | 3.5 | 1.5 | — | 13500 | 232 | D |
| EP0969075A1 | 23 | 3 | — | 5 | 340 | 3.5 | 1.5 | — | 13500 | 228 | K |
| EP0969075A1 | 25 | — | — | — | 340 | 3.5 | 1.5 | — | 13500 | 319 | M |
| EP0969075A1 | 25 | — | — | — | 350 | 3.5 | 1.5 | — | 13500 | 310 | G1 |
| EP0969075A1 | 25 | — | — | 5 | 340 | 3.5 | 1.5 | — | 13500 | 273 | O |
| EP0969075A1 | 25 | — | — | 5 | 350 | 3.5 | 1.5 | — | 13500 | 220 | I1 |
| EP0969075A1 | 25 | 3 | — | — | 340 | 3.5 | 1.5 | — | 13500 | 271 | N |
| EP0969075A1 | 25 | 3 | — | — | 350 | 3.5 | 1.5 | — | 13500 | 230 | H1 |
| EP0969075A1 | 25 | 3 | — | 5 | 340 | 3.5 | 1.5 | — | 13500 | 209 | L |
| EP0969075A1 | 25 | 3 | — | 5 | 350 | 3.5 | 1.5 | — | 13500 | 140 | B1 |
| EP0969075A1 | 27 | 3 | — | 5 | 340 | 3.5 | 1.5 | — | 13500 | 222 | J |
| EP0969075A1 | 30 | 3 | — | 5 | 340 | 3.5 | 1.5 | — | 13500 | 228 | E |
| WO99/67345 | 20.44 | — | — | — | 300 | 5.88 | 1.88 | 170 | 12286 | 3943 | example 12 |
| WO99/67345 | 20.44 | — | — | — | 320 | 5.88 | 1.88 | 170 | 12286 | 1960 | example 12 |
| WO99/67345 | 20.44 | — | — | — | 340 | 5.88 | 1.88 | 170 | 12286 | 756 | example 12 |
| WO99/67345 | 20.44 | — | — | — | 324 | 4 | 1.35 | 250 | 12286 | 1348 | example 15 |
| WO99/67345 | 20.44 | — | — | — | 334 | 4 | 1.35 | 250 | 12286 | 684 | example 15 |
| WO99/67345 | 20.44 | — | — | — | 354 | 4 | 1.35 | 250 | 12286 | 115 | example 15 |
| US2002/0070147A1 | 25 | 7 | — | — | 330 | 4 | 2 | 300 | 12000 | 21 | example 1 |
| US2002/0070147A1 | 25 | 7 | — | — | 340 | 2 | 1.5 | 300 | 12000 | 51 | example 1 |
| EP1832645A1 | 16 | — | — | — | 345 | 7 | 1.2 | 440 | 11600 | 6.5 | EXAMPLES |
| This invention | 20 | — | — | 3 | 330 | 3.5 | 2 | 200 | 13500 | 47 | C.1 |
| This invention | 20 | 5 | — | — | 330 | 3.5 | 2 | 200 | 13500 | 45 | C.2 |
| This invention | 20 | 5 | — | 3 | 330 | 2 | 2 | 200 | 13500 | 39 | C.3-1 |
| This invention[1] | 20 | 5 | — | 3 | 330 | 3 | 2 | 200 | 13500 | 20 | C.3-2 |
| This invention | 20 | 5 | — | 3 | 330 | 3.5 | 2 | 200 | 13500 | 17 | C.3-3 |
| This invention[1] | 20 | 5 | — | 3 | 330 | 4 | 2 | 200 | 13500 | 14 | C.3-4 |
| This invention[1] | 22 | 5 | — | 3 | 330 | 2 | 2 | 200 | 13500 | 35 | C.4-1 |
| This invention | 22 | 5 | — | 3 | 335 | 2 | 2 | 200 | 13500 | 31 | C.4-2 |
| This invention | 22 | 5 | — | 3 | 340 | 2 | 2 | 200 | 13500 | 27 | C.4-3 |
| This invention | 22 | 5 | — | 3 | 345 | 2 | 2 | 200 | 13500 | 23 | C.4-4 |
| This invention | 22 | 5 | — | 3 | 350 | 2 | 2 | 200 | 13500 | 19 | C.4-5 |
| This invention | 22 | 5 | — | 3 | 335 | 3 | 2 | 200 | 13500 | 19 | C.4-6 |
| This invention | 22 | 5 | — | 3 | 335 | 3.5 | 2 | 200 | 13500 | 16 | C.4.7 |
| This invention[1] | 22 | 5 | — | 3 | 335 | 4 | 2 | 200 | 13500 | 14 | C.4.8 |
| This invention | 22 | 5 | — | 3 | 335 | 4.5 | 2 | 200 | 13500 | 8 | C.4.9 |
| This invention | 22 | 5 | — | 3 | 335 | 5 | 2 | 200 | 13500 | 6 | C.4.10 |
| This invention | 22 | 5 | — | 3 | 340 | 3.5 | 2 | 200 | 13500 | 5 | C.4.11 |
| This invention | 20 | 3.5 | — | 3 | 330 | 3.5 | 2 | 200 | 13500 | 24 | C.5 |
| This invention | 20 | — | 5 | 3 | 330 | 3.5 | 2 | 200 | 13500 | 21 | C.6 |
| This invention | 20 | 5 | 5 | 3 | 330 | 3.5 | 2 | 200 | 13500 | 11 | C.7 |
| This invention | 16 | 5 | — | 3 | 330 | 3.5 | 2 | 200 | 13500 | 30 | C.8-1 |
| This invention | 16 | 5 | — | 3 | 340 | 3 | 2 | 200 | 13500 | 13 | C.8-2 |
| This invention | 16 | 5 | — | 3 | 340 | 4.5 | 2 | 200 | 13500 | 5 | C.8-3 |
| EP08170413.2 | 25 | 5 | — | — | 350 | 5 | 1.5 | 200 | 13500 | 200 | CoMoCNT |

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A hydrodesulfurization nanocatalyst comprising: a nanostructured alumina material; at least one metal selected from group VI B of the periodic table of elements, and at least one metal selected from group VIII B of the periodic table of elements, wherein the molar ratio of the metal selected from group VI B of the periodic table of elements to the metal selected from group VIII B of the periodic table of elements is from about 0.2 to about 0.5 and wherein the metals are present on the nanostructured alumina material in a form of multi-layer nanoclusters wherein the catalyst further comprises zeolite HY and $B_2O_3$ in a ratio of about 1:0.5.

2. The hydrodesulfurization nanocatalyst according to claim 1, wherein the nanostructured alumina material comprises at least one of alumina nanorods and alumina nanotubes.

3. The hydrodesulfurization nanocatalyst according to claim 1, wherein the nanostructured alumina material is nanostructured gamma-alumina.

4. The hydrodesulfurization nanocatalyst according to claim 1, wherein the nanostructured alumina material includes a surface area of from about 450 to about 800 $m^2/g$.

5. The hydrodesulfurization nanocatalyst according to claim 1, wherein the nanostructured alumina material includes a pore volume of from about 0.8 to about 3 $cm^3/g$.

6. The hydrodesulfurization nanocatalyst according to claim 1, wherein the nanostructured alumina material includes a mesoporous pore diameter of from about 9 to about 30 nm.

7. The hydrodesulfurization nanocatalyst according to claim 1, wherein the at least one metal selected from group VIB of the periodic table of elements and the at least one metal selected from group VIIIB of the periodic table of elements are present in an amount of from about 1 to about 30% by weight.

8. The hydrodesulfurization nanocatalyst according to claim 1, wherein the at least one metal selected from group VIB of the periodic table of elements comprises at least one of molybdenum and tungsten.

9. The hydrodesulfurization nanocatalyst according to claim 1, wherein the at least one metal selected from group VIIIB of the periodic table of elements comprises at least one of nickel and cobalt.

10. The hydrodesulfurization nanocatalyst according to claim 1, further comprising $P_2O_5$.

11. A method for removing sulfur from a stream comprising the step of contacting the stream with the hydrodesulfurization nanocatalyst of claim 1.

12. A process for producing a hydrodesulfurization nanocatalyst according to claim 1 comprising the steps of: providing a solution of at least one metal; impregnating the nanostructured alumina material in a solution comprising at least one metal to create a catalyst; and drying the catalyst.

* * * * *